Aug. 6, 1935. P. BOURQUE 2,010,796
CLUTCH MECHANISM
Filed June 22, 1931
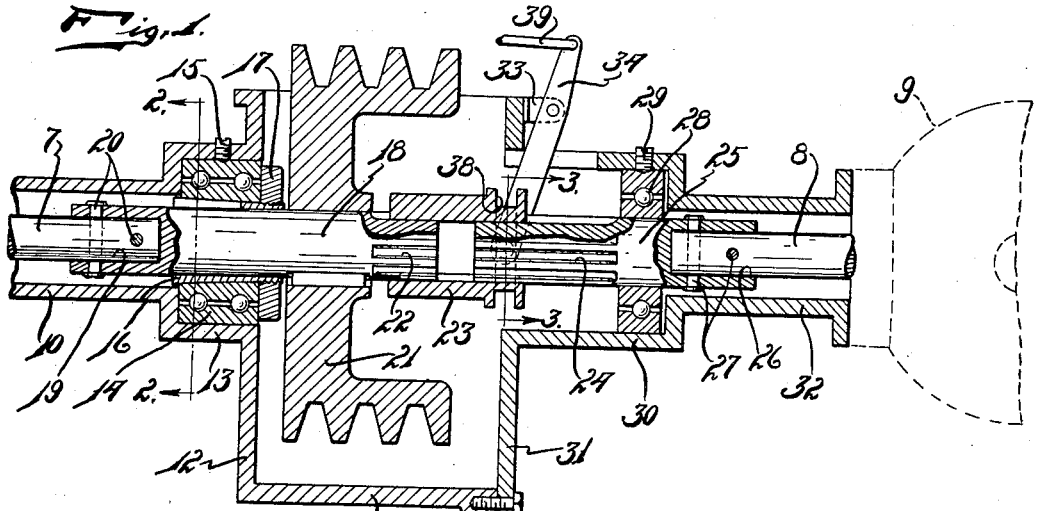
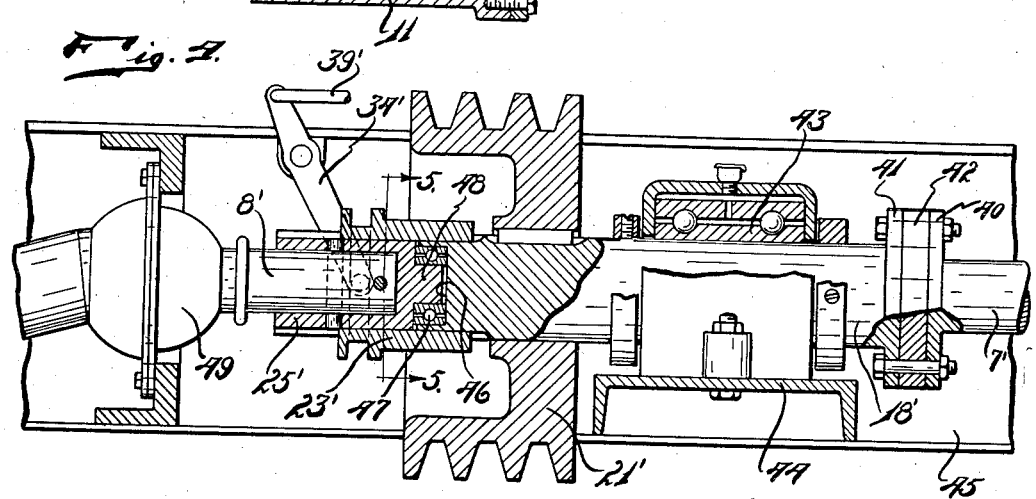
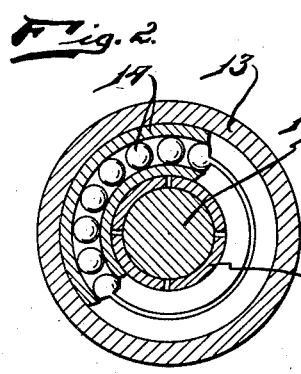
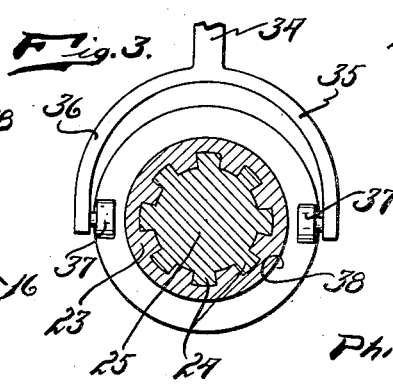
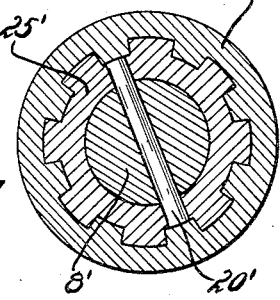
INVENTOR.
Philip Bourque
BY
Thos. Donnelly
ATTORNEY Patented Aug. 6, 1935

2,010,796

UNITED STATES PATENT OFFICE 2,010,796

CLUTCH MECHANISM

Philp Bourque, Detroit, Mich.

Application June 22, 1931, Serial No. 545,892

1 Claim. (Cl. 74—216.5)

My invention relates to a new and useful improvement in a clutch mechanism adapted particularly for use as a power take-off on automobiles such as trucks and the like. In such power take-offs, there is generally used a clutch mechanism which may be opened and closed at will so as to effect a rotation of a driving wheel or pulley in unison with the drive shaft which is used to drive the engine and at the same time permit the extension of the drive shaft which projects into the transmission box to be driven by the engine. On most of these power take-offs, a pulley is used for driving a belt which is connected to the mechanism to be operated by the vehicle engine. It is an object to provide a mechanism whereby the belt used for driving purposes may be removed and replaced with a minimum disturbance of the assembled structure.

Another object of the invention is the provision of a mechanism which may be interposed in the drive shaft of a vehicle having a clutch mechanism associated therewith so that one part of the shaft may be disconnected from the other part or driven in unison therewith at will and so arranged that at the separated ends a space may be readily provided for insertion of a belt or similar object therethrough.

Another object of the invention is the provision of a mechanism of this class which will be simple in structure, economical of manufacture, and highly efficient in use.

Another object of the invention is the provision of a clutch mechanism whereby a pair of aligned shafts may be entirely separated upon a moving of the clutch to inoperative position.

Other objects will appear hereinafter.

The invention consists in the combination and arrangement of parts hereinafter described and claimed.

The invention will be best understood by a reference to the accompanying drawing which forms a part of this specification, and in which, Fig. 1 is a central sectional view of the invention.

Fig. 2 is a sectional view taken on line 2—2 of Fig. 1.

Fig. 3 is a sectional view taken on line 3—3 of Fig. 1.

Fig. 4 is a longitudinal central vertical sectional view of a modified form of the invention.

Fig. 5 is a view taken on line 5—5 of Fig. 4.

In the form shown in Fig. 1, I have illustrated the invention used with a drive shaft 7 which is in alignment with the extension 8 thereof projecting into the differential housing 9. This shaft is enclosed by a tube 10 and formed on this tube I have provided a housing which is cup shaped and provided with the wall 11 and the base 12 having at its center the cup shaped formation 13 for reception of the bearing 14 which is held in position by the set screw 15. A tapered bushing 16 is projected through the bearing 14 and secured therein by the nut 17 which is threaded thereon. This bushing 16 embraces the stub extension shaft 18 which is provided with a socket 19 into which is extended the end of the drive shaft 7. This drive shaft 7 is secured by the pins 20 in the socket 19. Keyed on the stub shaft 18 is the drive pulley 21. The stub shaft 18 projects through the pulley 21 and its outwardly projecting end is provided with splines 22, this splined end being slidably projected into the spline clutch sleeve 23 which is slidably mounted on the splined portion 24 of the stub extension 25 which is provided with a socket 26 into which the end of the extension shaft 8 is projected and in which it is secured by the pins 27. The stub extension shaft 25 is journaled in the bearing 28 which is held in position by the set screw 29 in the cup shaped portion 30 of the housing cap 31. Extending from the cup shaped portion 30 is the tubular casing 32 which extends to the differential housing 9 and serves as a casing for the extension shaft 8. Pivoted on the lug 33 is the lever 34 which is provided with the yoke arms 35 and 36, each carrying a roller 37 engaging in the peripheral groove 38 formed on the sleeve 23. A rod 39 is connected to the lever 34 and may be directed to any desirable position so that the operator by rocking the lever 34 may move the clutch sleeve 23 into operative position as shown in Fig. 1 in which the splined portion 22 of the stub extension shaft 18 is embraced by the sleeve 23, or by rocking the lever 34 in the opposite direction, move the sleeve 23 out of engagement with the splined portion 22 and leave the space between the ends of the splined portions 22 and 24 clear so that a belt or other object may be encircled around the pulley 21. It is obvious with a structure of this kind that no disarrangement of the assembly is necessary at all, thus forming a structure which is quite efficient in operation and which may be arranged for operation at a minimum expense and particularly with a minimum amount of labor cost.

In the form shown in Fig. 4, the drive shaft 7' is provided with a flange 40 which is connected to a flange 41, on the stub extension shaft 18', a spacing disc 42 being interposed between the flanges 40 and 41. The extension stub shaft 18' is journaled in a bearing 43 which is supported on the cross bar 44 projected transversely of the chassis rails 45.

The pulley 21' is keyed to the stub extension shaft 18', the end of which is provided with a recess 46 of a depth substantially the thickness of the disc 42. A bearing 47 is mounted in this recess 46 and a reduced extension 48 of the stub extension shaft 25' is adapted to rotate in the bearing 47. This stub extension shaft 25' is secured in fixed relation on the extension shaft 8' which projects into the universal housing 49. The stub extension shaft 25' is splined on its periphery and the splined sleeve 23' is slidably mounted thereon and its slidable movement controlled by the lever 34' connected to which is the rod 39'. The construction is such that when the parts are in the form shown in Fig. 4, the shafts 7' and 8' will rotate in unison and when the lever 34' is rocked so that the sleeve 23' disengages from the splined end portion of the shaft 18', the shaft 18' will rotate without effecting a rotation of the shaft 8'. With this construction, in order to place a belt around the pulley 21', it is but necessary to disconnect the flanges 40 and 41, remove the spacing disc 42 so that the portion 48 will disengage from the bearing 47. By detaching the bearing 43 from the support 44, the shaft 18' with the pulley 21' attached thereto may be tilted to permit the positioning of the belt about the pulley 21'. While this construction involves a somewhat more laborious operation for removal and replacement of the belt about the pulley 21', than is required in the preferred form shown in Fig. 1, it is still but a slight alteration and a complete disassembly of the drive shaft and its connections is avoided.

While I have illustrated and described the preferred forms of construction of my invention, I do not wish to limit myself to the precise details of structure shown, but desire to avail myself of such variations and modifications as may come within the scope of the appended claim.

Having thus described my invention, what I claim as new and desire to secure by Letters Patent is:

In combination with a pair of aligned spaced apart rotating shafts, a sleeve embracing each of said shafts; a housing mounted on said sleeve between said shafts; a bearing mounted at opposite sides of said houing; a stub shaft mounted on each of said shafts and in alignment with each other and journalled in one of said bearings and extending inwardly of said housing; a pulley fixedly mounted on one of said stub shafts and located in said housing; the adjacent end of said stub shafts being spaced apart sufficiently to permit the passage therethrough of a belt for operating said pulley; means on one of said stub shafts for controlling the rotation of the other of said stub shafts in unison therewith, said means when in operative position bridging the space between adjacent ends of said stub shafts and enclosing the same; and means for moving said controlling means into operative and inoperative position at will without interfering with and during the rotation of said shafts.

PHILP BOURQUE.